US011820476B2

(12) United States Patent
Peljo et al.

(10) Patent No.: US 11,820,476 B2
(45) Date of Patent: Nov. 21, 2023

(54) DRIVE ARRANGEMENT FOR A CYCLOIDAL MARINE PROPULSION UNIT, A CYCLOIDAL MARINE PROPULSION UNIT AND A METHOD OF OPERATING SUCH A DRIVE ARRANGEMENT

(71) Applicant: ABB Oy, Helsinki (FI)

(72) Inventors: Veli-Pekka Peljo, Helsinki (FI); Harri Lipponen, Helsinki (FI); Timo Heine, Helsinki (FI); Kimmo Kokkila, Helsinki (FI); Bin Liu, Västerås (SE); Peter Fransson, Västerås (SE); Arne Trangard, Västerås (SE)

(73) Assignee: ABB Oy, Helsinki (FI)

( * ) Notice: Subject to any disclaimer, the term of this patent is extended or adjusted under 35 U.S.C. 154(b) by 235 days.

(21) Appl. No.: 17/413,047

(22) PCT Filed: Dec. 14, 2018

(86) PCT No.: PCT/FI2018/050920
§ 371 (c)(1),
(2) Date: Jun. 11, 2021

(87) PCT Pub. No.: WO2020/120826
PCT Pub. Date: Jun. 18, 2020

(65) Prior Publication Data
US 2022/0017197 A1 Jan. 20, 2022

(51) Int. Cl.
*B63H 1/10* (2006.01)
*B60L 53/22* (2019.01)
*B63H 21/17* (2006.01)

(52) U.S. Cl.
CPC ............ *B63H 1/10* (2013.01); *B60L 53/22* (2019.02); *B63H 21/17* (2013.01);
(Continued)

(58) Field of Classification Search
CPC .... B63H 1/10; B63H 21/17; B63H 2001/105; B60L 53/22; B60L 2210/10; B60L 2210/40
See application file for complete search history.

(56) References Cited

U.S. PATENT DOCUMENTS

| 1,823,169 A | 9/1931 | Ernst et al. | |
| 2015/0321740 A1* | 11/2015 | Bradley | B63H 1/10 416/1 |
| 2018/0254638 A1* | 9/2018 | Bonilla | H02J 50/10 |

FOREIGN PATENT DOCUMENTS

| DE | 20117451 U1 | 4/2002 |
| EP | 2709229 A1 | 3/2014 |
| EP | 2944556 A1 | 11/2015 |

OTHER PUBLICATIONS

International Search Report and Written Opinion of the International Searching Authority; Application No. PCT/FI2018/050920; Completed: Jul. 17, 2019; dated Jul. 24, 2019; 10 Pages.

\* cited by examiner

*Primary Examiner* — Stephen P Avila
(74) *Attorney, Agent, or Firm* — WHITMYER IP GROUP LLC (57) ABSTRACT

A drive arrangement for a cycloidal marine propulsion unit including at least two electrical blade motors each associated to a respective blade for pivoting thereof, each blade motor being operationally coupled to a respective blade drive for actuating the corresponding blade motor. The at least two blade drives each include a respective blade drive power converter operationally coupled to a first common intermediate DC-link, wherein the at least two blade drives being configured to feed power from the first common intermediate DC-link to their respective blade motors, and to feed regenerative power from their respective blade motors to the (Continued)

first common intermediate DC-link. The disclosure also concerns a marine propulsion unit having such a drive arrangement, and a method of operating such a drive arrangement.

25 Claims, 5 Drawing Sheets

(52) U.S. Cl.
CPC ....... *B60L 2210/10* (2013.01); *B60L 2210/40* (2013.01); *B63H 2001/105* (2013.01)

DRIVE ARRANGEMENT FOR A CYCLOIDAL MARINE PROPULSION UNIT, A CYCLOIDAL MARINE PROPULSION UNIT AND A METHOD OF OPERATING SUCH A DRIVE ARRANGEMENT

TECHNICAL FIELD

The present disclosure relates to cycloidal propulsion units for marine vessels, and more particularly to drive arrangements for cycloidal marine propulsion units. The present disclosure further concerns a marine vessel equipped with such a marine propulsion unit and a method for operating such a drive arrangement.

BACKGROUND

Cycloidal propulsion, often referred to as cyclorotor propulsors or Voith-Schneider propulsors, have typically been used for marine propulsion in applications requiring high maneuverability.

Typically, such propulsion units comprise a rotatable disk, onto which a plurality of vertically extending blades rotated along a rotor disk, while the pitch angle of the blades is changed based on the rotational position of the blade in order to achieve thrust in a desired direction. In conventional arrangements. Conventionally, both the rotating plate and the blades have been actuated by a prime mover, such as a diesel engine, coupled with mechanical power transmission means. Cycloidal propulsion provides good maneuverability for marine vessels and has thus been used in applications such as tugboats, ferries and offshore drilling boats.

Recently also electrically driven arrangements have been considered, as improved control and efficiency may be achieved. As a result, cycloidal propulsion has become a feasible option for marine vessels in applications previously considered unsuitable or uneconomical. For example, publication EP 2 944 556 A1 discloses an electrically driven cycloidal marine propulsion unit.

However, known electrically driven arrangements still leave room for improving efficiency further, while simultaneously new applications for the use of marine vessels equipped with electrical cycloidal marine propulsion units has further increased the requirements for reliability.

SUMMARY

An object of the present disclosure is to provide a drive arrangement for a cycloidal propulsion unit, and a method of operating such a drive arrangement improving the efficiency of the associated propulsion unit and marine vessel. It is a further object of the present disclosure to provide such a marine propulsion unit and marine vessel.

The object of the disclosure is achieved by a drive arrangement for a cycloidal marine propulsion unit, a cycloidal marine propulsion unit, a marine vessel and a method for operating a drive arrangement for a cycloidal marine propulsion unit, which are characterized by what is stated in the independent claims. The preferred embodiments of the disclosure are disclosed in the dependent claims.

The disclosure is based on the idea of actuating the blades of the cycloidal propulsion unit with electric motors coupled to respective drives having power converters sharing a common intermediate DC-link.

An advantage of the disclosure is that regenerative power from the blade motors may be recovered and fed to other components coupled to the DC-link, thereby improving the efficiency of the associated cycloidal marine propulsion unit and marine vessel.

BRIEF DESCRIPTION OF THE DRAWINGS

In the following the disclosure will be described in greater detail by means of preferred embodiments with reference to the accompanying drawings, in which.

DETAILED DESCRIPTION

According to a first aspect of the present disclosure, a drive arrangement 1 for a cycloidal marine propulsion unit 2 is provided.

The drive arrangement comprises at least two electrical blade motors 3a each associated to a respective blade 3 for pivoting thereof. Each blade motor 3a is operationally coupled to a respective blade drive 3b for actuating the corresponding blade motor.

Particularly, the at least two blade drives 3b each comprise a respective blade drive power converter operationally coupled to a first common intermediate DC-link 4. Moreover, the at least two blade drives 3b are configured to feed power from the first common intermediate DC-link 4 to their respective blade motors 3a, and to feed regenerative power from their respective blade motors 3a to the first common intermediate DC-link 4.

For example, electrical power may be fed to the first common intermediate DC-link 4 from a main power supply by the at least two blade drives 3b, or by a first main drive 5b.

Such an arrangement enables regenerative power from a blade motor to be fed to the first common intermediate link 4, and consequently, to be utilized by any other component operatively coupled to said first common intermediate DC-link 4. For example, the regenerative power from on blade motor 3a could be utilized by another, or the by a first main motor 5a for rotating the rotary body 6 of the cycloidal propulsion unit, given that it is electrically driven. This increases the efficiency of the associated cycloidal marine propulsion unit and -vessel. In addition, dimensioning of braking choppers and/or braking resistors may be decreased, or even eliminated altogether.

In an embodiment according to the first aspect of the present disclosure, the drive arrangement 1 comprises at least two further electrical blade motors 3a' each associated to a respective blade 3' for pivoting thereof. Each further blade motor 3a) is operationally coupled to a respective further blade drive 3b' for actuating the corresponding further blade motor 3a'.

The further blade drives 3b' each comprise a respective blade drive power converter operationally coupled to a second common intermediate DC-link 4'. Moreover, the further blade drives 3b' are configured to feed power from the second common intermediate DC-link 4' to their respective blade motors 3a', and to feed regenerative power from their respective blade motors (3a') to the second common intermediate DC-link 4'.

For example, electrical power may be fed to the second common intermediate DC-link 4' from a main power supply by the at least two further blade drives 3b', or by a second main drive 5b'.

Such an arrangement enables regenerative power from a further blade motor 3a' to be fed to the second common intermediate link 4', and consequently, to be utilized by any other component operatively coupled to said second DC-link 4'. For example, the regenerative power from one further blade motor 3a' could be utilized by another, or the by a second main motor 5a' for rotating the rotary body 6 of the cycloidal propulsion unit, given that it is electrically driven.

Furthermore, such an arrangement provides two independent common intermediate DC-links 4, 4', thereby increasing redundancy of the drive arrangement, while still increasing the efficiency of the associated cycloidal marine propulsion unit and -vessel. In addition, dimensioning of braking choppers and/or braking resistors may be decreased, or even eliminated altogether.

In an embodiment according to the first aspect of the present disclosure, the drive arrangement 1 comprises at least a first main electric motor 5a associated to a main rotary body 6 for rotation thereof. The main motor 5a is operationally coupled to a respective first main drive 5b.

Preferably, but not necessarily, the first main drive 5b comprises a first main power converter operationally coupled to the first common intermediate DC link 4. The first main drive is further configured to feed power from the first common intermediate DC-link 4 to the first main motor 5a.

Preferably, but not necessarily, the first main drive 5b is configured to feed power form a main power supply to the first common intermediate DC-link to be utilized by the first main motor 5a' via the first main power converter and the at least two blade motors 3a via their respective blade drives.

Such an arrangement enables the regenerative power generated by the at least two blade motors 3a to be utilized the first main motor. This is considered particularly advantageous, as the power consumption of the first main motor is generally much higher than that of the at least two blade motors 3a, thereby reducing or even eliminating the need for a braking chopper and/or braking resistors.

In special circumstances, where the first electric main motor 5a generates regenerative power, the first main drive 5b may also be configured to feed power from the main motor 5a to the first common intermediate DC-link 4 to be utilized by other components coupled to said DC-link 4.

In an embodiment according to the first aspect of the present disclosure, where a first common intermediate DC-link 4 and a second common intermediate DC-link 4' are provided, the drive arrangement 1 comprises at least a first main electric motor 5a associated to a rotary body 6 for rotation thereof, such that the first main motor 5a comprises a first stator winding operationally coupled to a respective first main drive 5b, and a second stator winding operationally coupled to a respective second main drive 5b'.

The first main drive 5b comprises a first main power converter operationally coupled to the first common intermediate DC link 4. Moreover, the first main drive is configured to feed power from the first common intermediate DC-link 4 to the first stator winding of the first main motor 5a. Respectively, the second main drive 5b' comprises a second main power converter operationally coupled to the second common intermediate DC link 4'.

Moreover, the second main drive 5b' is configured to feed power from the second common intermediate DC-link 4' to the second stator winding of the first main motor 5a'.

In special circumstances, where the first electric main motor 5a generates regenerative power, the first main drive 5b may also be configured to feed power from first stator winding of first the main motor 5a to the first common intermediate DC-link 4 to be utilized by another component coupled to said DC-link 4. Correspondingly, the second main drive 5b' may also be configured to feed power from second stator winding of first the main motor 5a to the second common intermediate DC-link 4' to be utilized by other component coupled to said DC-link 4'.

In an embodiment according to the first aspect of the present disclosure, where a first common intermediate DC-link 4 and a second common intermediate DC-link 4' are provided, the drive arrangement 1 comprises at least a first electric main motor 5a and second electric main motor 5a' associated to a rotary body 6 for rotation thereof. The first electric main motor 5a is operationally coupled to a respective first main drive 5b, and said second electric main motor 5a' is operationally coupled to a respective second main drive 5b'.

The first main drive 5b' comprises a first main power converter operationally coupled to the first common intermediate DC-link 4 and is configured to feed power from the first common intermediate DC-link 4 to the first electric main motor 5a.

In special circumstances, where the first electric main motor 5a generates regenerative power, the first main drive 5b may also be configured to feed power from the first main motor 5a to the first common intermediate DC-link 4 to be utilized by other components coupled to said DC-link 4.

The second main drive 5b' comprises a second main power converter operationally coupled to the second common intermediate DC-link 4' and is configured to feed power from the second common intermediate DC-link 4' to the second electric main motor 5a'.

In special circumstances, where the second electric main motor 5a' generates regenerative power, the second main drive 5b' may also be configured to feed power from the second main motor 5a' to the second common intermediate DC-link 4 to be utilized by other components coupled to said DC-link 4.

In an embodiment according to the first aspect of the present disclosure, the electrical drive arrangement 1 further comprising an energy storage unit 12a; 12a' operationally coupled to either or both of the first common intermediate DC-link 4 and the second common intermediate DC-link 4'. Preferably, but not necessarily, the energy storage unit 12a; 12a', is coupled to the first intermediate DC-link 4, second intermediate DC-link 4', or both, via a respective power storage power converter 12b; 12b' of the DC/DC-type. Such a power storage power converter 12b; 12b' is configured to receive and feed electrical power from and to either, or both, of the first common intermediate DC-link 4 and the second common intermediate DC-link 4'.

Such an arrangement is particularly advantageous when the drive arrangement is used in a marine propulsion unit where the rotation of the main rotary body 6 is actuated by a combustion engine 11 via a mechanical power transmission arrangement. This is because, generally speaking, the power demand for rotating the main rotary body 6, exceeds regenerative power generated by the blade motors 3a, 3a', whereas, at certain circumstances, the overall power demand for pivoting the blades 3 might not. Consequently, an energy storage unit 12a, 12a' may be used for temporarily storing regenerative power generated by the blade motors 3a, 3a' when the overall power demand for pivoting the blades 3 is less than the regenerative power generated by the blade motors 3a, 3a', and subsequently, feeding said stored regenerative power when the overall power demand for pivoting the blades 3 again exceeds the regenerative power generated by the blade motors 3a, 3a'.

It should be noted, that the first aspect of the present disclosure encompasses any combination of one or more embodiments discussed above, including any variants thereof, in accordance with the appended Claims.

According to a second aspect of the present disclosure, a cycloidal marine propulsion unit 2 is provided. Particularly, the cycloidal marine propulsion unit 2 comprises the drive arrangement according to the first aspect of the present disclosure.

The marine propulsion unit 2 further comprises a main rotary body 6 having a central axis and a mounting body 7 for supporting the rotary body 6 on a hull 8 of a marine vessel such that the rotary body 6 is rotatable about said central axis with respect to the hull 8.

The marine propulsion unit 2 further comprises a plurality of blades 3, 3' extending axially from the rotary body 6 away from the hull 8, when in use, for rotation with the rotary body 6 about the central axis 2a. The blades 3, 3' are mounted for pivotal movement with respect to the rotary body 6, about respective blade axes generally parallel, i.e. parallel or near parallel, to the central axis.

The marine propulsion unit 2 further comprises a rotary coupling 9 arranged to provide electrical power transmission between the rotary body 6 and the remaining marine vessel 8.

In an embodiment according to the second aspect of the present disclosure, the blade drives 3b, 3b' are arranged within the hull 8 of the marine vessel. In such a case the rotary coupling 9 is arranged to provide independent electrical power transmission between each of the blade drives 3b, 3b' and their respective blade motors 3a, 3a'.

In an embodiment according to the second aspect of the present disclosure, the blade drives 3b; 3b' are arranged within the main rotary body 6. In such a case the rotary coupling 9 is arranged to provide electrical power transmission between a power source within the hull 8 of the marine vessel and the blade drives 3b; 3b'.

In an embodiment according to the second aspect of the present disclosure, in which the blade drives 3b; 3b' are arranged within the main rotary body 6, the rotary coupling 9 may be arranged to provide independent electrical power transmission between a power source within the hull 8 of the marine vessel and each the blade drives 3b; 3b'. For example, the rotary coupling may be configured to provide independent AC-power transmission for each of the blade drives 3b; 3b', while one or more common *intermedia* DC-links 4; 4', may then be provided between blade drives within the rotary body 6.

In an embodiment according to the second aspect of the present disclosure, in which the blade drives 3b; 3b' are arranged within the main rotary body 6, the rotary coupling 9 may be arranged to provide at least a common electrical power transmission between a power source within the hull 8 of the marine vessel and each the blade drives 3b; 3b'. For example, the rotary coupling may be configured to provide a common AC-power transmission for each of the blade drives 3b; 3b', while one or more common *intermedia* DC-links 4; 4', may then be provided between blade drives within the rotary body 6.

Preferably but not necessarily, the rotary coupling 9 is further arranged to provide the common electrical power transmission for the first common intermediate DC-link 4. For example, the blade motors 3a; 3a' may be AC motors and blade drives 3b; 3b' may be DC-AC converters. Alternatively, the blade motors 3a; 3a' may be DC motors and the blade drives 3b; 3b' may be DC-DC converters.

In an embodiment according to the second aspect of the present disclosure, in which a first intermediate DC-link 4' and a second intermediate DC-link 4' are provided and the blade drives 3b; 3b' are arranged within the main rotary body 6, the rotary coupling 9 is arranged to provide at least a first electrical power transmission and a second electrical power transmission for a first group of blade drives 3b and a second group of blade drives 3b', respectively.

Preferably, but not necessarily, the rotary coupling 9 is further arranged to provide the first electrical power transmission for the first common intermediate DC-link 4, and the second electrical power transmission for the second common intermediate DC-link 4', For example, the blade motors 3a; 3a' may be AC motors and the blade drives 3b; 3b' may be DC-AC converters. Alternatively, the blade motors 3a; 3a' may be DC motors and the blade drives 3b; 3b' may be DC-DC converters.

In an embodiment according to the second aspect of the present disclosure, the cycloidal marine propulsion unit 2 further comprises a first mechanical power transmission arrangement 10 associated to a rotary body 6 for rotation thereof.

In a variant of this embodiment, the cycloidal marine propulsion unit further comprises at least a first combustion engine 11 coupled to the first mechanical power transmission arrangement 10 for rotation of the main rotary body 6.

In an alternative variant of this embodiment, where the cycloidal marine propulsion unit 2 is equipped with a drive arrangement having a first electric main motor 5a, second electric motor 5a', or both, said first, second, or both, electric motors 5a; 5a' are coupled to the first mechanical power transmission 10 for rotation of the main rotary body 6.

In an embodiment according to the second aspect of the present disclosure, where the cycloidal marine propulsion unit 2 is equipped with a drive arrangement having a first electric main motor 5a, second electric motor 5a', or both, said first, second, or both, electric motors 5a; 5a' are configured as direct drive motors for rotation of the main rotary body 6. In such a configuration, a rotor of a direct drive motor is fixed to the rotary body 6, and the stator of the direct drive motor is fixed with respect to the hull 8.

It should be noted, that the second aspect of the present disclosure encompasses any combination of one or more embodiments discussed above, including any variants thereof, in accordance with the appended Claims.

According to a third aspect of the present disclosure, a method of operating a drive arrangement for a cycloidal marine propulsion unit is provided.

With at least two blade drives 3b, power is fed to at least two respective electrical blade motors 3a, so as to pivot blades 3 corresponding to their respective blade motors 3a. Suitably, the blades are pivoted pre-determined sequence in order to generate thrust in a desired direction with the associated marine propulsion unit 2.

Particularly, the at least two blade drives 3b each comprise a respective blade drive power converter operationally coupled to a first common intermediate DC-link (4), and power is fed to the at least two blade motors 3a from the first common intermediate DC-link (4).

During operation of the associated marine propulsion unit 2, when regenerative power is produced by either of the at last two blade motors 3a, said regenerative power is fed to the first common intermediate DC-link 4 with the associated blade drive 3b.

In an embodiment according to the third aspect of the present disclosure, power is fed to at least two further respective blade motors 3a' with at least two further blade drives 3b', so as to pivot blades 3' corresponding to their respective blade motors 3a'.

The at least two further blade drives 3b' each comprise a respective blade drive power converter operationally coupled to a second common intermediate DC-link 4', and power is fed to the at least two further blade motors 3a' from the second common intermediate DC-link 4'.

During operation of the associated marine propulsion unit 2, when regenerative power is produced by either of the at least two further blade motors 3a', said regenerative power is fed to the second common intermediate DC-link 4' with the associated further blade drive 3b'.

In an embodiment according to the third aspect of the present disclosure, power is fed with a first main drive 5b to a first main electric motor 5a associated to a main rotary body 6 for rotation thereof.

Preferably, but not necessarily, the first main drive 5b comprises a first main power converter operationally coupled to the first common intermediate DC link 4. Moreover, power is fed with the first main drive 5b from the first common intermediate DC-link 4 to the first main motor 5a.

In an embodiment according to the third aspect of the present disclosure, where a first and second common intermediate DC-link is provided, power is fed with the first main drive 5b to a first stator winding of the first main motor 5a, and with a second main drive to a second stator winding of the first main motor.

The first main drive 5b comprises a first main power converter operationally coupled to the first common intermediate DC link 4. Moreover, power is fed from the first common intermediate DC-link 4 to the first stator winding of the first main motor 5a.

The second main drive 5b' comprising a second main power converter operationally coupled to the second common intermediate DC link 4'. Moreover, power is fed from the second common intermediate DC-link 4' to the second stator winding of the first main motor 5a.

In an embodiment according to the third aspect of the present disclosure, where a first and second common intermediate DC-link is provided, power is fed with a first main drive 5b to a first electric main motor 5a associated to a main rotary body 6 for rotation thereof, and power is fed with a second main drive 5b' to a second electric main motor 5a' associated to the main rotary body 6 for rotation thereof.

The first main drive 5b' comprises a first main power converter operationally coupled to the first common intermediate DC-link 4. Moreover, power is fed from the first common intermediate DC-link 4 to the first electric main motor 5a.

The second main drive 5b' comprises a second main power converter operationally coupled to the second common intermediate DC-link 4'. Moreover, power is fed from the second common intermediate DC-link 4' to the second electric main motor 5a'.

It should be noted, that the third aspect of the present disclosure encompasses any combination of one or more embodiments discussed above, including any variants thereof, in accordance with the appended Claims.

Figure 1:
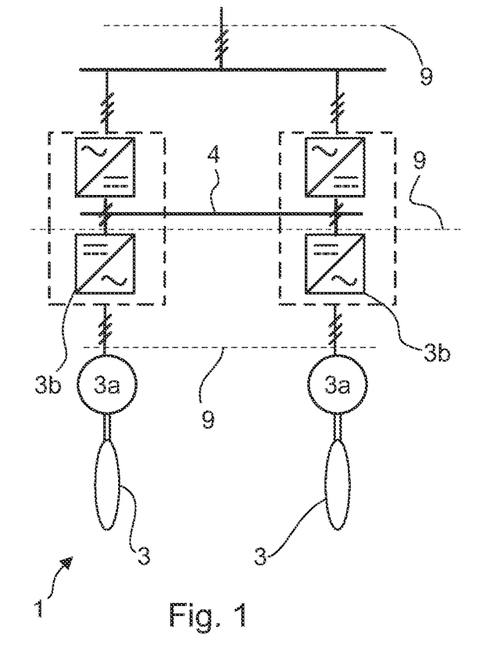
FIGS. 1-7 schematically illustrate alternative drive arrangements for cycloidal marine propulsion units according to various embodiments of the present disclosure, and FIGS. 8-13 schematically illustrate alternative configurations for cycloidal marine propulsion units according to various embodiments of the present disclosure.

FIG. 1 illustrates schematically a drive arrangement for a cycloidal marine propulsion unit according to an embodiment of the present disclosure.

Particularly, two blades 3 of cycloidal marine propulsion unit 2 are coupled to respective electric motors 3a for pivoting said blades. The electric motors 3a are each actuated by corresponding blade drives 3b, which in turn are power by a common power supply (not shown). Particularly, in FIG. 1, the power supply provides AC-power, the blade motors 3a are AC-motors, and the blade drives 9a are AC/DC-AC power converters having their respective intermediate DC-links coupled together, thus forming the common intermediate DC-link 4.

Moreover, FIG. 1 illustrates three alternative positions for a rotary coupling arrangement 9. Firstly, if the power supply is provided within the hull 8 of the marine vessel and the blade drives 3b and motors 3a are provided on a rotary body 6 of the marine propulsion unit, the rotary coupling arrangement could be arranged to provide common AC-power transmission between the power supply and both blade drives 3b.

Secondly, if the power supply is and the AC-DC rectifier portion of the blade drives 3b are provided within the hull 8 of the marine vessel and the DC/AC inverter portion of the blade drives 3b and blade motors 3a are provided on a rotary body 6 of the marine propulsion unit, the rotary coupling arrangement could be arranged to provide common DC-power transmission, i.e. the common intermediate DC link 4, between rectifier portion and the inverter portion of the blade drive 3b.

Thirdly, if the power supply and the blade drives are provided within the hull 8 of the marine vessel and the motors 3a are provided on a rotary body 6 of the marine propulsion unit, the rotary coupling arrangement could be arranged to provide separate AC-power transmission between each corresponding blade drives 3b and blade motor 3a.

Figure 2:
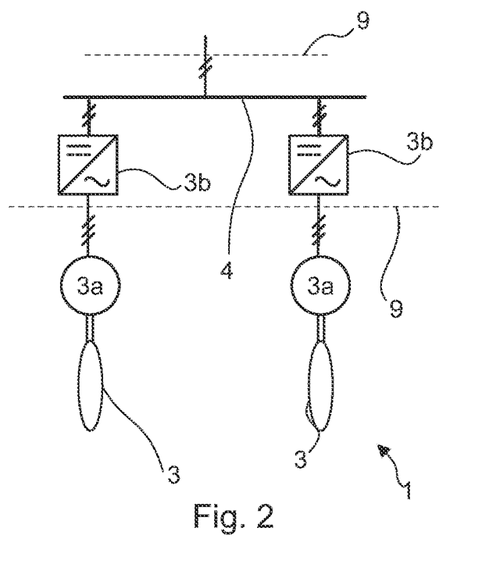

FIG. 2 illustrates schematically a drive arrangement for a cycloidal marine propulsion unit according to an embodiment of the present disclosure, similar to that of FIG. 1.

As opposed to the arrangement of FIG. 1, however, in the arrangement of FIG. 2 the power supply provides DC-power, the blade motors 3a are AC-motors, and the blade drives 9a are DC-AC power converters being coupled together on the DC-side, thus forming the common intermediate DC-link 4.

Moreover, FIG. 2 illustrates two alternative positions for a rotary coupling arrangement 9. Firstly, if the power supply is provided within the hull 8 of the marine vessel and the blade drives 3b and motors 3a are provided on a rotary body 6 of the marine propulsion unit, the rotary coupling arrangement could be arranged to provide common DC-power transmission, i.e. the common intermediate DC link 4, between the power supply and the blade drive 3b.

Secondly, if the power supply and the blade drives 3b are provided within the hull 8 of the marine vessel and the and motors 3a are provided on a rotary body 6 of the marine propulsion unit, the rotary coupling arrangement could be arranged to provide separate AC-power transmission between each corresponding blade drive 3b and blade motor 3a.

Figure 3:
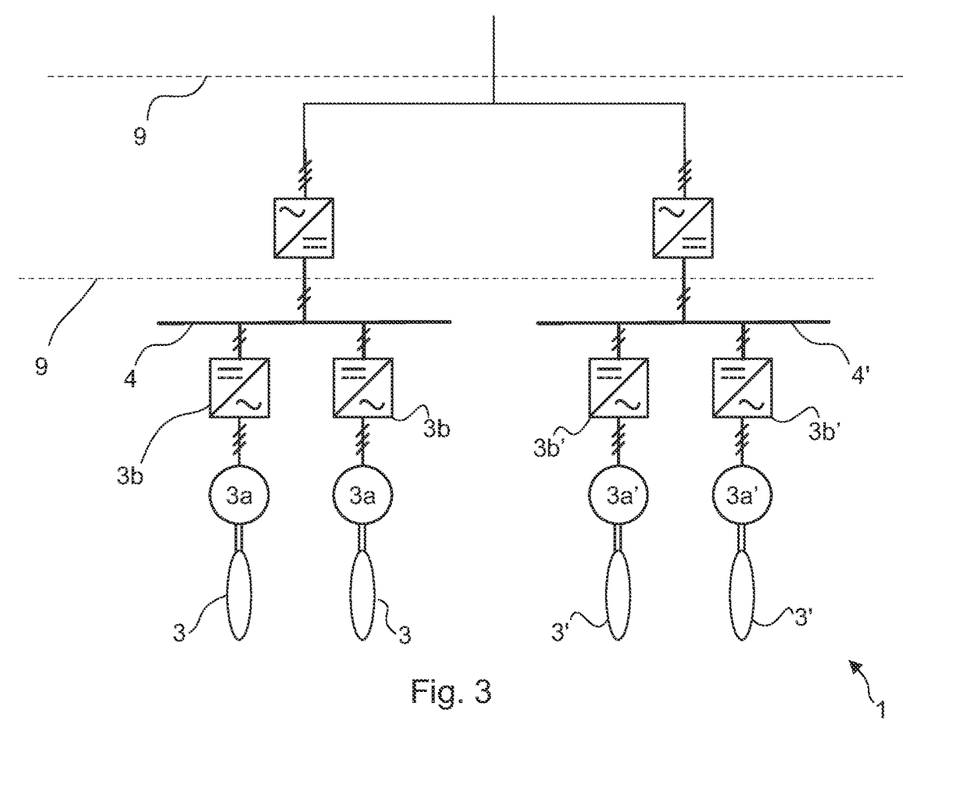

FIG. 3 illustrates schematically a drive arrangement for a cycloidal marine propulsion unit according to an embodiment of the present disclosure.

Particularly, two blades 3 of the cycloidal marine propulsion unit 2 are coupled to respective electric motors 3a, provided as AC-motors, for pivoting said blades. The electric motors 3a are each actuated by corresponding blade drives 3b, provided as DC-AC inverters coupled to a respective common AC-DC rectifier.

Moreover, two further blades 3' of the cycloidal marine propulsion unit 2 are coupled to respective two further electric motors 3a', provided as AC-motors 3', for pivoting said blades. The further electric motors 3a' are each actuated by corresponding further blade drives 3b', provided as DC-AC inverters coupled to a respective common further AC-DC rectifier. A common AC power supply provides power to the AC-DC rectifier and the further AC-DC rectifier.

The blade drives 3b are coupled together on their DC-side via the first common intermediate DC-link 4, through which the AC-DC rectifier then distributes power to the blade drives 3b. Correspondingly, the further blade drives 3b' are coupled together on their DC-side via the second common intermediate DC-link 4', through which the further AC-DC rectifier then distributes power to the further blade drives 3b'.

Moreover, FIG. 3 illustrates two alternative positions for a rotary coupling arrangement 9. Firstly, if the power supply is provided within the hull 8 of the marine vessel, and the AC-DC rectifiers 3a'b, 3b', the blade drives 3b, 3b' and motors 3a, 3a' are provided on a rotary body 6 of the marine propulsion unit, the rotary coupling arrangement could be arranged to provide common AC-power transmission between the power supply and both AC-DC-rectifiers.

Secondly, if the power supply and the AC-DC rectifiers are provided within the hull 8 of the marine vessel and the blade drives 3b, 3b' and blade motors 3a, 3a' are provided on a rotary body 6 of the marine propulsion unit, the rotary coupling arrangement could be arranged to provide two separate DC-power transmissions, i.e. the first common intermediate DC link 4 and the second common intermediate DC-link 4', between the AC-DC rectifiers and the blade drives 3b, 3b'.

Figure 4:
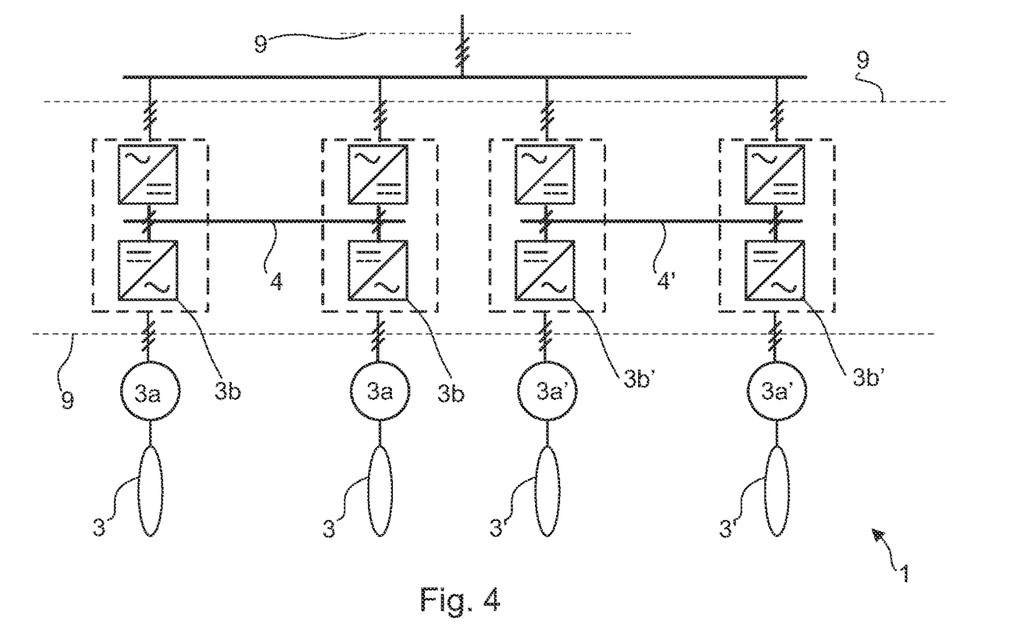

FIG. 4 illustrates schematically a drive arrangement for a cycloidal marine propulsion unit according to an embodiment of the present disclosure.

Particularly, two blades 3 of the cycloidal marine propulsion unit 2 are coupled to respective electric motors 3a, provided as AC-motors, for pivoting said blades. The electric motors 3a are each actuated by corresponding blade drives 3b, provided as AC/DC-AC converters.

Moreover, two further blades 3' of the cycloidal marine propulsion unit 2 are coupled to respective two further electric motors 3a', provided as AC-motors, for pivoting said blades 3'. The further electric motors 3a' are each actuated by corresponding further blade drives 3b', provided as AC/DC-AC converters.

A common AC power supply, located within the hull 8 of a marine vessel, provides power to the blade drives 3b and the further blade drives.

The blade drives 3b are coupled together by their intermediate DC-links, thus forming the first common intermediate DC-link 4. Correspondingly, the further blade drives 3b' are coupled together on by their intermediate DC-links, thus forming the second common intermediate DC-link 4'.

Moreover, FIG. 4 illustrates three alternative positions for a rotary coupling arrangement 9. Firstly, if the power supply is provided within the hull 8 of the marine vessel and the blade drives 3b, 3b' and motors 3a, 3a' are provided on a rotary body 6 of the marine propulsion unit, the rotary coupling arrangement could be arranged to provide common AC-power transmission between the power supply and blade drives 3b, 3b'.

Secondly, if the power supply is provided within the hull 8 of the marine vessel and the blade drives 3b, 3b' and motors 3a, 3a' are provided on a rotary body 6 of the marine propulsion unit, the rotary coupling arrangement 9 could be arranged to provide separate AC-power transmission between the power supply and each of the blade drives 3b, 3b'.

Thirdly, if the power supply and the blade drives 3b, 3b' are provided within the hull 8 of the marine vessel and the motors 3a, 3a' are provided on a rotary body 6 of the marine propulsion unit, the rotary coupling arrangement could be arranged to provide separate AC-power transmission between each corresponding blade drive 3b, 3b' and blade motor 3a, 3a'.

Figure 5:
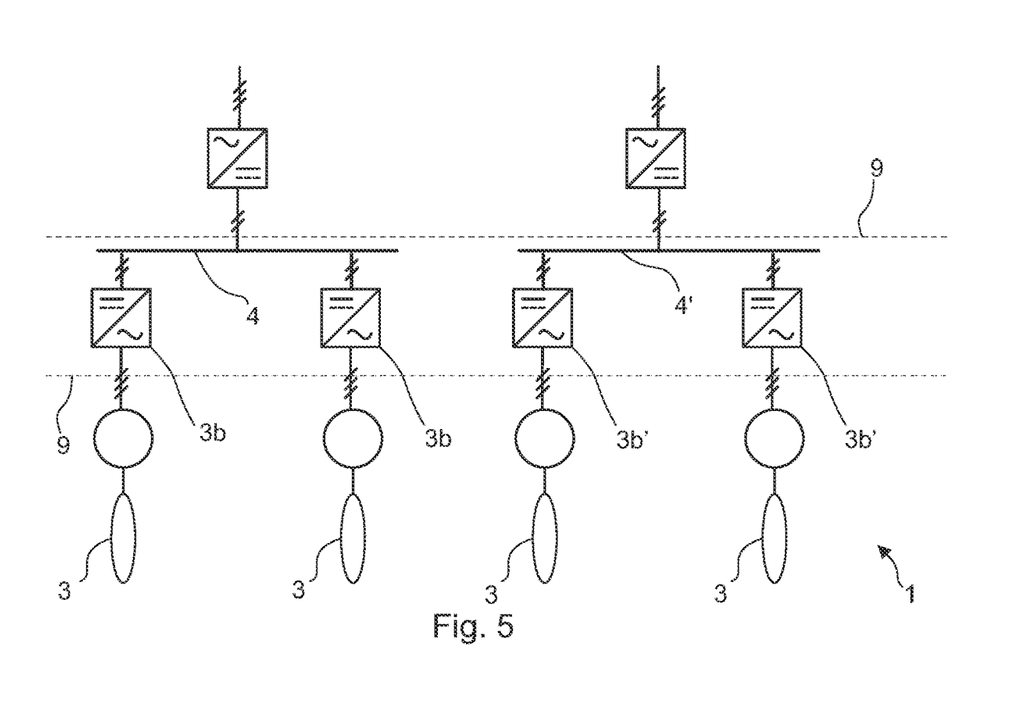

FIG. 5 illustrates schematically a drive arrangement for a cycloidal marine propulsion unit according to an embodiment of the present disclosure.

Particularly, the arrangement of FIG. 5 is similar to that of FIG. 3, with the exception of the AC-DC rectifier associated to the blade drives 3b, and the further AC-DC rectifiers associated to the further blade drives 3b' being couples to separate respective power supplies (not shown in FIG. 5).

Consequently, FIG. 5 illustrates two alternative positions for a rotary coupling arrangement 9. Firstly, if the power supplies, the AC-DC rectifier and the further AC-DC rectifier are provided within the hull 8 of the marine vessel, and the blade drives 3b, 3b' and motors 3a, 3a' are provided on a rotary body 6 of the marine propulsion unit, the rotary coupling arrangement could be arranged to provide separate DC-power transmission between the blade drives 3b and the associated AC-DC rectifier, i.e. the first common intermediate DC-link 4, and between the further blade drives 3b' and the associated further AC-DC rectifier, i.e. the second intermediate DC-link 4'.

Secondly, if the power supply and the blade drives 3b, 3b' in addition to their associated AC-DC rectifiers are provided within the hull 8 of the marine vessel and the motors 3a, 3a' are provided on a rotary body 6 of the marine propulsion unit, the rotary coupling arrangement could be arranged to provide separate AC-power transmission between each corresponding blade drive 3b, 3b' and blade motor 3a, 3a'.

Figure 6:
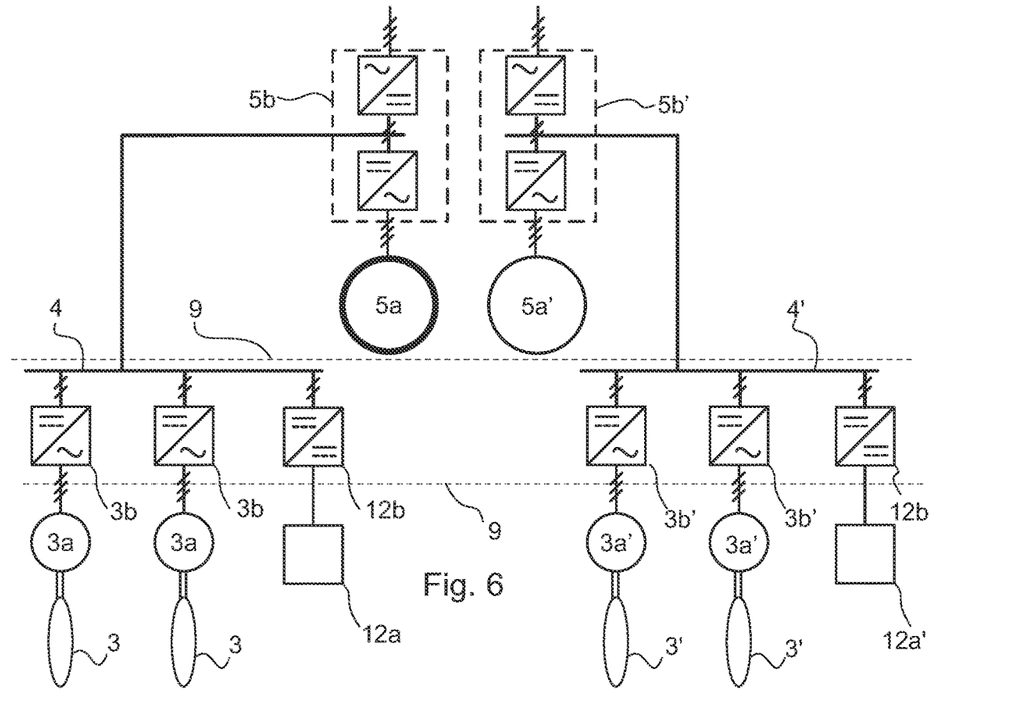

FIG. 6 illustrates schematically a drive arrangement for a cycloidal marine propulsion unit according to an embodiment of the present disclosure.

Particularly, the arrangement of FIG. 6 is similar to that of FIG. 5, with the addition of a first main motor 5a actuated by a first main drive 5b, and a second main motor 5a' actuated by the second main drive 5b'. The first and second main motors 5a, 5a' are provided as AC-motors, and the first and second main drives 5b, 5b' are provided as AC/DC-AC converters coupled to separate AC-power sources. It should be noted that, alternatively, the first and second main drives 5b, 5b' could be coupled to a common power source.

Moreover, as compared to FIG. 5, in the arrangement of FIG. 6 the AC-DC rectifier associated to the blade drives 3b is provided as the AC-DC rectifier of the first main drive 5b. In other words, the intermediate DC-link of the first main drive 5b is coupled to those of the blade drives 3b, i.e. the DC-side of the DC-AC inverter, thus forming the first common intermediate DC-link 4. In addition, a first energy unit 12a is coupled to the first common intermediate DC-link 4 via a first energy storage power converter 12b provided as a DC-DC converter.

Correspondingly, the AC-DC rectifier associated to the further blade drives 3b' is provided as the AC-DC rectifier of the second main drive 5b'. In other words, the intermediate DC-link of the second main drive 5b' is coupled to those of the further blade drives 3b, i.e. the DC-side of the DC-AC inverter, thus forming the second common intermediate DC-link 4'. In addition, a second energy unit 12a' is coupled to the second common intermediate DC-link 4' via a second energy storage power converter 12b' provided as a DC-DC converter.

Moreover, FIG. 6 illustrates two alternative positions for a rotary coupling arrangement 9. Firstly, if the first and second main drives 5b, 5b' are provided within the hull 8 of the marine vessel, and the blade drives 3b, 3b', blade motors 3a, 3a', energy storage units 12a, 12a' and energy storage power converters 12b, 12b' are provided on a rotary body 6 of the marine propulsion unit, the rotary coupling arrangement could be arranged to provide separate DC-power transmission between the blade drives 3b, first energy storage power converter 12b and the intermediate DC-link of the first main drive 5b, i.e. the first common intermediate DC-link 4, and between the further blade drives 3b', second energy storage power converter 12b' and the intermediate DC-link of the second main drive 5b', i.e. the second common intermediate DC-link 4'.

Secondly, if the first and second main drives 5b, 5b', the blade drives 3b, 3b' and the energy storage power converters 12b, 12b' are provided within the hull 8 of the marine vessel and the motors 3a, 3a' in addition to the energy storage units 12a, 12a' are provided on a rotary body 6 of the marine propulsion unit, the rotary coupling arrangement 9 could be arranged to provide separate AC-power transmission between each corresponding blade drive 3b, 3b' and blade motor 3a, 3a', and separate DC-power transmission between each corresponding energy storage power converter 12b, 12b' and energy storage unit 12a, 12a'.

Figure 7:
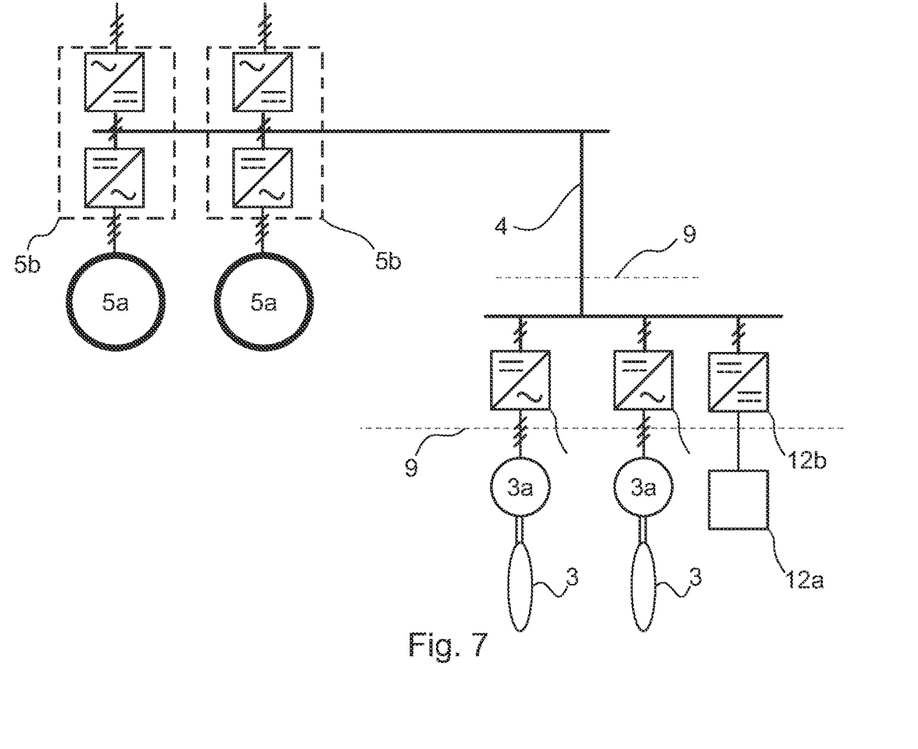

FIG. 7 illustrates schematically a drive arrangement for a cycloidal marine propulsion unit according to an embodiment of the present disclosure.

Particularly, the arrangement of FIG. 7 is similar to that of FIG. 2, with the addition of two first main motors 5a respectively actuated by two first main drives 5b. The first main motors 5a are provided as AC-motors, and the first main drives 5b are provided as AC/DC-AC converters coupled to separate AC-power sources. It should be noted that, alternatively, the first main drives 5b could be coupled to a common power source.

Furthermore, as compared to FIG. 2, in the arrangement of FIG. 7, the AC-DC rectifier associated to the first blade drives 3b is provided as the two AC-DC rectifiers of the two first main drives 5b. In other words, the intermediate DC-links of the two first main drives 5b are coupled to those of the blade drives 3b, i.e. the DC-side of the DC-AC inverter, thus forming the first common intermediate DC-link 4. In addition, a first energy unit 12a is coupled to the first common intermediate DC-link 4 via a first energy storage power converter 12b provided as a DC-DC converter.

Moreover, FIG. 7 illustrates two alternative positions for a rotary coupling arrangement 9. Firstly, if the first main drives 5b are provided within the hull 8 of the marine vessel, and the blade drives 3b, the blade motors 3a, the energy storage unit 12a, and the energy storage power converter 12b are provided on a rotary body 6 of the marine propulsion unit, the rotary coupling arrangement could be arranged to provide separate DC-power transmission between the blade drives 3b, the first energy storage power converter 12b and the intermediate DC-link of the first main drive 5b, i.e. the first common intermediate DC-link 4.

Secondly, if the first main drives 5b, the blade drives 3b and the energy storage power converters 12b are provided within the hull 8 of the marine vessel and the blade motors 3a, in addition to the energy storage unit 12a are provided on a rotary body 6 of the marine propulsion unit, the rotary coupling arrangement 9 could be arranged to provide separate AC-power transmission between each corresponding blade drive 3b and blade motor 3a, and separate DC-power transmission between the energy storage power converter 12b and the corresponding energy storage unit 12a.

Figure 8:
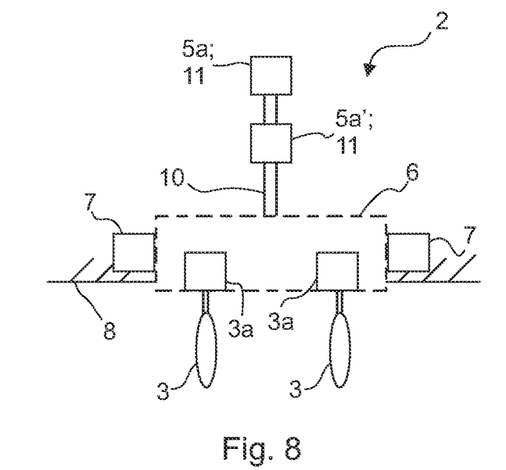

FIG. 8 schematically illustrates a configuration for a cycloidal marine propulsion unit 2 according to an embodiment of the present disclosure.

Particularly, FIG. 8 shows a main rotary body 6 of a cycloidal marine propulsion unit 2. The rotary body 6 is supported on a hull 8 of a marine vessel by a mounting body 7, such that the rotary body 6 is rotatable with respect to the hull 8. Moreover, the rotary body 6 carries blades 3 pivotable about their longitudinal axes by respective blade motors 3a; 3a' so as to create thrust when rotated along with the rotary body 6.

Furthermore, one or more main motors 5a; 5a'; 11 may be coupled to the rotary body 6 by means of a first mechanical power transmission arrangement 10 for rotating the rotary body 6. That is, one or more first main motors 5a, second main motors 5a' or combustion engines 11 may be coupled to the first mechanical power transmission arrangement.

In the configuration of FIG. 8 the first mechanical power transmission arrangement is provided a direct coupling, i.e. without gearing, namely as a central shaft fixed to the rotary body and extending along the central axis thereof.

Figure 9:
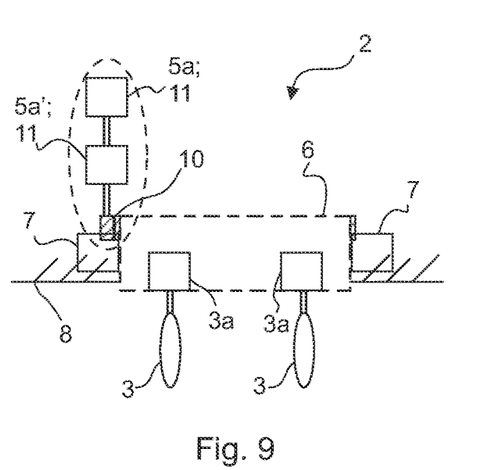

FIG. 9 schematically illustrates a configuration for a cycloidal marine propulsion unit 2 according to an embodiment of the present disclosure.

Particularly, the configuration of FIG. 9 is similar to that of FIG. 8, with the exception of the first mechanical power transmission arrangement 10 being provided as geared transmission between an outer circumference of the rotary body 6 and a common shaft of a main motor set having at least a first main motor 5a and a second main motor 5', two or more combustion engines 11, or a first main motor 5a having at least two or more stator windings. Alternatively, the first mechanical power transmission arrangement 10 could be provided as a geared transmission between the inner circumference of the rotary body 6 and common shaft of the motor set.

Figure 10:
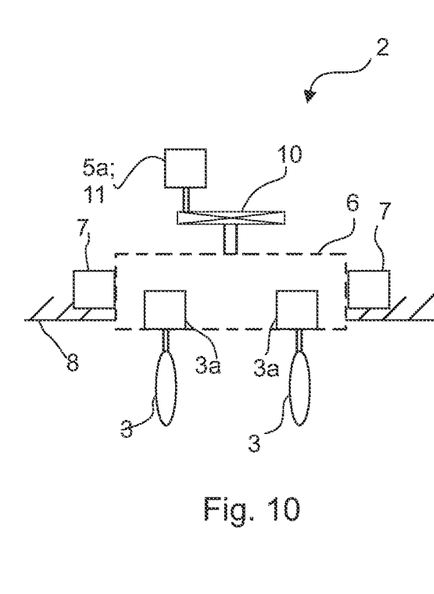

FIG. 10 schematically illustrates a configuration for a cycloidal marine propulsion unit 2 according to an embodiment of the present disclosure.

Particularly, the configuration of FIG. 10 is similar to that of FIG. 10, with the exception of the first mechanical power transmission arrangement 10 being provided as geared transmission between a shaft of the rotary body 6 and that of a main motor provided as a main electrical motor 5a or combustion engine 11.

Figure 11:
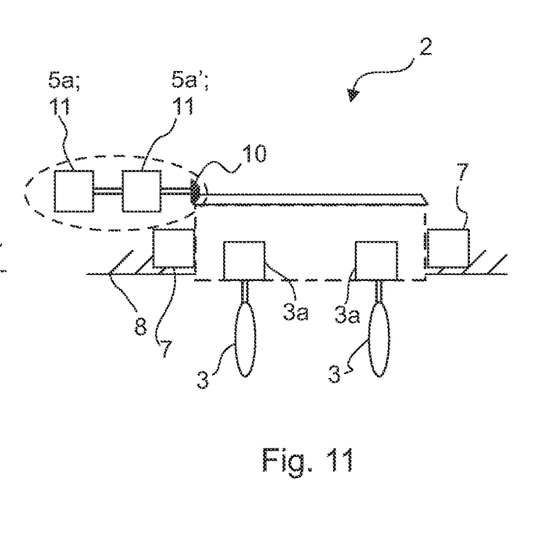

FIG. 11 schematically illustrates a configuration for a cycloidal marine propulsion unit 2 according to an embodiment of the present disclosure.

Particularly, the configuration of FIG. 11 is similar to that of FIG. 11, with the exception of the first mechanical power transmission arrangement 10 being provided as geared transmission having a bevel gear configuration. Namely, the common shaft of the motor set is generally perpendicular to the central axis of the rotary body 6.

It should be noted, that although FIGS. 8, 9 and 11 are illustrated with two main motors 5a, 5a', 11, corresponding arrangements could be implemented with a single main motor or with more than two main motors.

Figure 12:
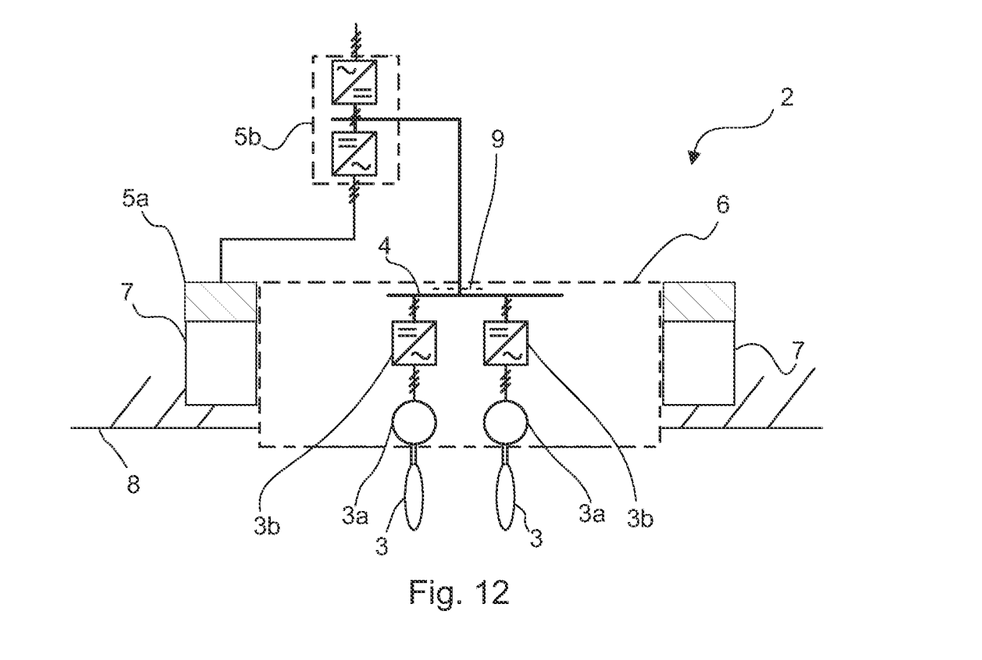

FIG. 12 schematically illustrates a cycloidal marine propulsion unit 2 having a drive arrangement according to an embodiment of the present disclosure. Particularly, the main rotary body 6 is rotatably supported on the hull 8 of a marine vessel by mounting body 7.

The main motor 5a for rotating the main rotary body 6 is provided as a direct drive AC-motor having a rotor fixed to, and surrounding the circumference of the rotary body 6, while the stator is provided surrounding the rotor and fixed with respect to the hull 8. The main motor is operationally coupled to the main drive 5b, provided as an AC-DC/AC converter. The main drive is operationally coupled to a power source (not illustrated).

Blades 3 are provided extending from the main rotary body 6, outwardly from the hull 8. The blades 3 are actuated by blade motors 3a, provided as AC-motors, arranged within the main rotary body 6. The blade motors 3 are operatively coupled to respective blade drives 3b, namely DC/AC converters, also provided within the main rotary body 6.

The DC-side of the DC/AC converters are operatively coupled together by a common intermediate DC-link 4. The common intermediate DC-link is operatively coupled to an intermediate DC-link of the main drive 5b, via a rotary coupling arrangement 9 at least partly provided within the main rotary body.

Figure 13:
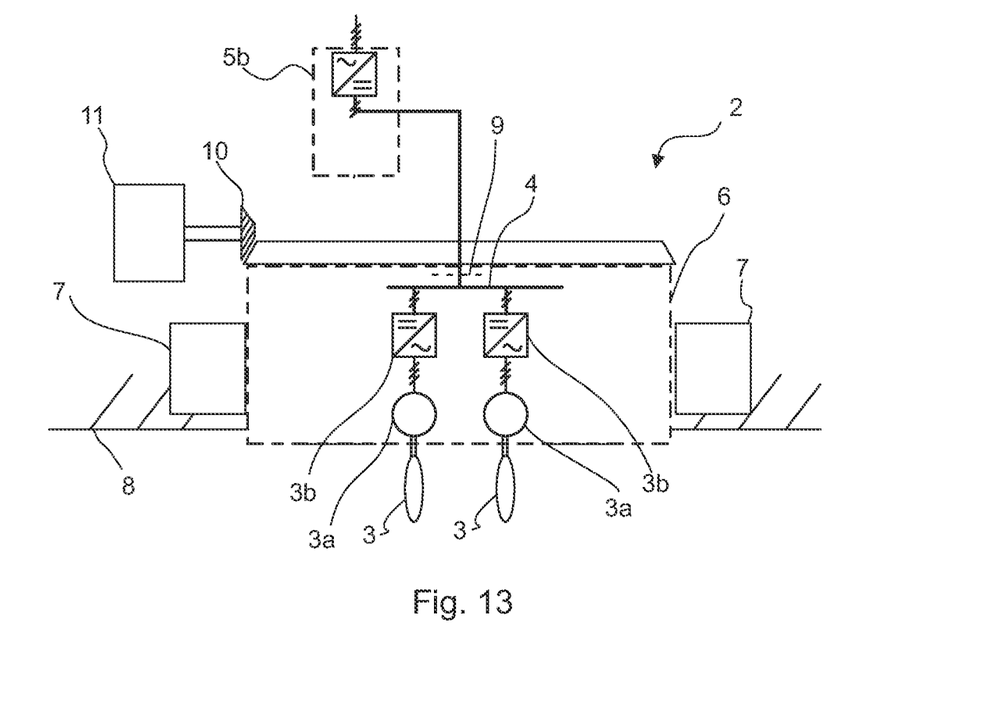

FIG. 13 schematically illustrates a cycloidal marine propulsion unit 2 having a drive arrangement according to an embodiment of the present disclosure.

Particularly, the arrangement of FIG. 13 is similar to that of FIG. 12 with the exception of the main rotary body 6 being rotted by an internal combustion engine 11 via the mechanical power transmission arrangement 10. Also, the main drive 5b, coupled to the blade drives 3b via the common intermediate DC-link 4 and the rotary coupling arrangement 9, is provided as a AC/DC-converter.

As a more general remark, it should also be noted that although the present disclosure has been described above while referring to two blades 3, blade motors 3a and blade drives, and/or correspondingly further blades 3', further blade motors 3a' and further blade drives 3b', for the purpose of clarity, the drive arrangement and marine propulsion unit according to the present disclosure are preferably implemented having more than two of such components. For example, a drive arrangement and a marine propulsion unit according to the present disclosure may preferably be implemented having a total of 4, 6 or 8 blades 3, 3', blade motors 3a, 3a' and blade drives 3b, 3b' each

The invention claimed is:

1. A drive arrangement for a cycloidal marine propulsion unit, said drive arrangement comprising:
    at least two electrical blade motors each associated to a respective blade for pivoting thereof, each blade motor being operationally coupled to a respective blade drive for actuating the corresponding blade motor,
    wherein the at least two blade drives each include a respective blade drive power converter operationally coupled to a first common intermediate DC-link, and
    wherein the at least two blade drives are configured to feed power from the first common intermediate DC-link to their respective blade motors, and to feed regenerative power from their respective blade motors to the first common intermediate DC-link.

2. The drive arrangement according to claim 1, further comprising at least two further electrical blade motors each associated to a respective blade for pivoting thereof, each further blade motor being operationally coupled to a respective further blade drive for actuating the corresponding further blade motor,
    wherein the further blade drives each include a respective blade drive power converter operationally coupled to a second common intermediate DC-link, and
    wherein the further blade drives being configured to feed power from the second common intermediate DC-link to their respective blade motors, and to feed regenerative power from their respective blade motors to the second common intermediate DC-link.

3. The drive arrangement according to claim 1, further comprising at least a first main electric motor associated to a main rotary body for rotation thereof, said main motor being operationally coupled to a respective first main drive.

4. The drive arrangement according to claim 3, wherein the first main drive comprises a first main power converter operationally coupled to the first common intermediate DC link, the first main drive being configured to feed power from the first common intermediate DC-link to the first main motor.

5. The drive arrangement according to claim 2, further comprising at least a first main electric motor associated to a rotary body for rotation thereof, said first main motor including a first stator winding operationally coupled to a respective first main drive, and a second stator winding operationally coupled to a respective second main drive,
    wherein the first main drive includes a first main power converter operationally coupled to the first common intermediate DC link, the first main drive being configured to feed power from the first common intermediate DC-link to the first stator winding of the first main motor, and
    wherein the second main drive includes a second main power converter operationally coupled to the second common intermediate DC link, the second main drive being configured to feed power from the second common intermediate DC-link to the second stator winding of the first main motor.

6. The drive arrangement according to claim 2, further comprising at least a first electric main motor and second electric main motor associated to a rotary body for rotation thereof, said first electric main motor being operationally coupled to a respective first main drive, and said second electric main motor being operationally coupled to a respective second main drive,
    wherein the first main drive includes a first main power converter operationally coupled to the first common intermediate DC-link, the first main drive being configured to feed power from the first common intermediate DC-link to the first electric main motor, and
    wherein the second main drive includes a second main power converter operationally coupled to the second common intermediate DC-link, the second main drive being configured to feed power from the second common intermediate DC-link to the second electric main motor.

7. The drive arrangement according to claim 1, further comprising an energy storage unit operationally coupled to either or both of the first common intermediate DC-link and the second common intermediate DC-link, preferably via a respective power storage power converter of the DC/DC-type, so as to receive and feed electrical power from and to, respectively, either or both of the first common intermediate DC-link and the second common intermediate DC-link.

8. A cycloidal marine propulsion unit, comprising a drive arrangement including:
    at least two electrical blade motors each associated to a respective blade for pivoting thereof, each blade motor being operationally coupled to a respective blade drive for actuating the corresponding blade motor, wherein the at least two blade drives each include a respective blade drive power converter operationally coupled to a first common intermediate DC-link, and wherein the at least two blade drives are configured to feed power from the first common intermediate DC-link to their respective blade motors, and to feed regenerative power from their respective blade motors to the first common intermediate DC-link, and wherein said marine propulsion unit includes:
- a main rotary body having a central axis;
- a mounting body for supporting the rotary body on a hull of a marine vessel such that the rotary body is rotatable about said central axis with respect to the hull;
- a plurality of blades extending axially from the rotary body away from the hull, when in use, for rotation with the rotary body about the central axis, wherein each blade is mounted for pivotal movement with respect to the rotary body, about respective blade axes generally parallel to the central axis, and
- a rotary coupling being arranged to provide electrical power transmission between the rotary body and the remaining marine vessel.

9. The cycloidal marine propulsion unit according to claim 8, wherein the blade drives are arranged within the hull of the marine vessel, and
wherein the rotary coupling being arranged to provide independent electrical power transmission between each of the blade drives and their respective blade motors.

10. The cycloidal marine propulsion unit according to claim 8, wherein the blade drives are arranged within the main rotary body, and
wherein the rotary coupling being arranged to provide electrical power transmission between a power source within the hull of the marine vessel and the blade drives.

11. The cycloidal marine propulsion unit according to claim 10, wherein the rotary coupling being arranged to provide independent electrical power transmission between a power source within the hull of the marine vessel and each the blade drives.

12. The cycloidal marine propulsion unit according to claim 10, wherein the rotary coupling being arranged to provide a common electrical power transmission between a power source within the hull of the marine vessel and each the blade drives.

13. The cycloidal marine propulsion unit according to claim 12, wherein the rotary coupling being further arranged to provide the common electrical power transmission for the first common intermediate DC-link, and
wherein blade motors are AC motors and blade drives are DC-AC converters, or
wherein blade motors are DC motors and blade drives are DC-DC converters.

14. The cycloidal marine propulsion unit according to claim 10, wherein the rotary coupling being arranged to provide at least a first electrical power transmission and a second electrical power transmission for a first group of blade drives and a second group of blade drives, respectively.

15. The cycloidal marine propulsion unit according to claim 14, wherein the rotary coupling being further arranged to provide the first electrical power transmission for the first common intermediate DC-link, and the second electrical power transmission for the second common intermediate DC-link,
wherein blade motors are AC motors and blade drives are DC-AC converters, or
wherein blade motors are DC motors and blade drives are DC-DC converters.

16. The cycloidal marine propulsion unit according to claim 8, further comprising a first mechanical power transmission arrangement associated to a rotary body for rotation thereof.

17. The cycloidal marine propulsion unit according to claim 16, further comprising at least a first combustion engine coupled to the first mechanical power transmission arrangement for rotation of the main rotary body.

18. The cycloidal marine propulsion unit according to claim 16, further comprising the drive arrangement according to claim 3, wherein the first electric main electric motor, second electric main motor, or both, are coupled to the first mechanical power transmission for rotation of the main rotary body.

19. The cycloidal marine propulsion unit according to claim 7, further comprising a drive arrangement, said drive arrangement including:
- at least two electrical blade motors each associated to a respective blade for pivoting thereof, each blade motor being operationally coupled to a respective blade drive for actuating the corresponding blade motor,
wherein the at least two blade drives each include a respective blade drive power converter operationally coupled to a first common intermediate DC-link, and
wherein the at least two blade drives are configured to feed power from the first common intermediate DC-link to their respective blade motors, and to feed regenerative power from their respective blade motors to the first common intermediate DC-link;
- at least a first main electric motor associated to a main rotary body for rotation thereof, said main motor being operationally coupled to a respective first main drive;
wherein the first electric main electric motor, second electric main motor, or both, are configured as direct drive motors for rotation of the main rotary body.

20. A method of operating a drive arrangement for a cycloidal marine propulsion unit, comprising the steps of:
- with at least two blade drives, feeding power to at least two respective electrical blade motors, so as to pivot blades corresponding to their respective blade motors,
wherein the at least two blade drives each include a respective blade drive power converter operationally coupled to a first common intermediate DC-link, feeding power to the at least two blade motors from the first common intermediate DC-link, and
- when regenerative power is produced by either of the at last two blade motors, feeding said regenerative power to the first common intermediate DC-link with the associated blade drive.

21. The method according to claim 20, further comprising the steps of:
- with at least two further blade drives, feeding power to at least two further respective blade motors, so as to pivot blades corresponding to their respective blade motors,
wherein the at least two further blade drives each include a respective blade drive power converter operationally coupled to a second common intermediate DC-link, feeding power to the at least two further blade motors from the second common intermediate DC-link, and
- when regenerative power is produced by either of the at least two further blade motors, feeding said regenerative power to the second common intermediate DC-link with the associated further blade drive.

22. The method according to claim 20, further comprising the step of feeding power, with a first main drive, to a first main electric motor associated to a main rotary body for rotation thereof.

23. The method according to claim 22, wherein the first main drive comprising a first main power converter operationally coupled to the first common intermediate DC link, and by feeding power, with the first main drive, from the first common intermediate DC-link to the first main motor.

24. The method according to claim 21, further comprising the steps of feeding power, with the first main drive to a first stator winding of the first main motor, and with a second main drive to a second stator winding of the first main motor,
   wherein the first main drive comprising a first main power converter operationally coupled to the first common intermediate DC link, feeding power from the first common intermediate DC-link to the first stator winding of the first main motor, and
   wherein the second main drive including a second main power converter operationally coupled to the second common intermediate DC link, feeding power from the second common intermediate DC-link to the second stator winding of the first main motor.

25. The method according to claim 21, further comprising the steps of:
   feeding power, with a first main drive to a first electric main motor associated to a main rotary body for rotation thereof,
   feeding power with a second main drive to a second electric main motor associated to the main rotary body for rotation thereof,
   wherein the first main drive comprises a first main power converter operationally coupled to the first common intermediate DC-link, feeding power from the first common intermediate DC-link to the first electric main motor, and
   wherein the second main drive includes a second main power converter operationally coupled to the second common intermediate DC-link, feeding power from the second common intermediate DC-link to the second electric main motor.

\* \* \* \* \*